(12) United States Patent
Cowland et al.

(10) Patent No.: US 6,325,115 B1
(45) Date of Patent: Dec. 4, 2001

(54) VALVE

(75) Inventors: John Patrick Cowland, Royston; Nicholas Deepak Tuliani, Cambridge, both of (GB)

(73) Assignee: Syngenta Crop Protection, Inc, Greensboro, NC (US)

(*) Notice: Subject to any disclaimer, the term of this patent is extended or adjusted under 35 U.S.C. 154(b) by 0 days.

(21) Appl. No.: 09/524,230

(22) Filed: Mar. 13, 2000

(51) Int. Cl.⁷ .................................................. B65B 1/06
(52) U.S. Cl. ...................... 141/346; 141/353; 141/384
(58) Field of Search ................................... 141/346, 348, 141/349, 351, 352, 353, 354, 372, 383, 384, 386

(56) References Cited

U.S. PATENT DOCUMENTS

| | | | |
|---|---|---|---|
| 1,979,850 | * 11/1934 | Young et al. | 141/346 |
| 2,254,997 | * 9/1941 | Fisher | 137/614.03 |
| 4,344,469 | * 8/1982 | Brown | 141/90 |
| 4,947,986 | 8/1990 | Ballu . | |
| 4,949,570 | 8/1990 | Harmon et al. . | |
| 5,641,012 | * 6/1997 | Silversides | 141/383 |
| 6,050,309 | * 4/2000 | Woodruff | 141/346 |

FOREIGN PATENT DOCUMENTS

| | | |
|---|---|---|
| 0 389 919 | 10/1990 | (EP) . |
| 0 498 473 | 8/1992 | (EP) . |
| 0 498 474 | 8/1992 | (EP) . |
| 0 685 155 | 12/1995 | (EP) . |

OTHER PUBLICATIONS

V.E. Banks, F.D. Tenne; Proceedings Brighton Conf., 1991, pp. 739–742.

* cited by examiner

*Primary Examiner*—David J. Walczak
*Assistant Examiner*—Peter deVore
(74) *Attorney, Agent, or Firm*—William A Teoli, Jr.

(57) ABSTRACT

A valve for controlling the flow of granules from a first container to a second container, the valve, when in use, attached to the first container, comprising a movable valve member which is biased to a closed position and engagement means for engaging, in use, with a coupling unit attached to the second container, wherein, in use, the relative rotation of the valve to the coupling unit controls the extent to which the valve is opened.

15 Claims, 5 Drawing Sheets

VALVE

This invention relates to a valve for controlling the flow of granules from a first container to a second container and, in particular, a valve in which the rotation of the valve controls the extent to which the valve is opened.

Conventional valve systems, such as those disclosed in EP 0389919, EP 0498473 and EP 0498474, which control the flow of granular material, especially chemical material for use in the agricultural industry, have taught the use of two self sealing valve members, one located on each of the container to be emptied and the receiving container. A mechanical engagement means is provided such that the valves must cooperate and are opened in a sequence such whereby the valve on the receiving container is the first valve to open and the last valve to close. This feature permits any material which has been discharged from the container to be emptied to enter the receiving container prior to the closing of the valve. This prevents the operator of the valve system from coming into contact with the granular material being transferred.

The ability of this prior system to prevent the granular material from coming into contact with the operator is of great importance when the material to be transferred is a granular pesticide for use in the agricultural industry.

Such valve arrangements have a number inherent disadvantages. Firstly the system is complex to manufacture due to the large number of moving parts and this, in turn, increases the cost of such a product. Secondly often these prior valve systems are designed for use with a material feed device such as a feed drill. This means that a constant rate supply of material is required and accordingly the construction of such prior valve systems does not permit any variable control to be maintained over the rate of flow of the granular material. The valve system can only be in one of two distinct states: either fully closed or fully open.

Accordingly it is an object of the present invention to provide a valve which is simple to manufacture and which contains the minimum of moving parts.

It is a further object of the invention to provide a valve which can easily and simply control the rate of flow of the granular material from the container to be emptied.

According to one aspect of the present invention there is provided a valve for controlling the flow of granules from a first container to a second container, the valve, when in use attached to the first container, comprising a movable valve member which is biased to a closed position and engagement means for engaging, in use, with a coupling unit attached to the second container, wherein, in use, the relative rotation of the valve to the coupling unit controls the extent to which the valve is opened.

According to a second aspect of the present invention there is provided a system of transferring granules from a first container to a second container, the system comprising a valve of the type defined above and a coupling unit, when in use, arranged to be attached to the second container and having means for engagement with the rotatable valve.

Preferably the valve is provided with a valve seat on which the movable valve member rests when in the closed position. The movable valve member may be provided with sealing faces which cut through the granule flow to prevent granular material from being trapped between the movable valve member and the valve seat when the valve is closed.

The coupling unit may be provided with a central tube having a slot for engagement with the movable valve member, the slot having a section substantially parallel to an axis, and a spiral section.

In use, the coupling unit may be attached to a mixing tank or to a tube which feeds directly into a mixing tank.

Preferably the movable valve member is provided with a pin for engagement in the spiral section. Further, the pin may only be removed from the slot when the valve member is in the fully closed position. This arrangement provides a "fail-safe" mechanism which prevents the valve system from being disconnected whilst the valve is still open. Therefore, it prevents unwanted granular material spillage and reduces the likelihood of operator exposure to the chemicals. In this way, the safety of the system is greatly improved.

The biasing means for urging the movable valve member to the closed position may be a helical steel spring.

The valve may be provided with a tamper evident ring for engagement with the first container and the valve. The tamper evident ring may be seated on a series of raised portions on the first container and may engage with similar projections on the valve. Alternatively the valve may be provided with recessed portions for receiving raised portions of the tamper evident ring. When the valve is rotated relative to the receiving container the tamper evident ring, which is formed from two parts frangibly joined together, is separated into distinct portions. The provision of the tamper evident ring helps to eliminate the risk of cross contamination of the stored product. Further the tamper evident ring provides evidence of an unauthorised attempt to unscrew the valve from the container.

The provision of a valve which can be removed from and reattached to the container enables refilling of the container. This is particularly advantageous when the valve, and the container to which this is attached, is used for dispensing a hazardous chemical, such as granular pesticide. This is because it enables the container to be reusable and for a closed loop refillable system to be set up between the granular material supplier and end user.

The valve may be used with containers which are translucent and which may be provided with graduated markings so that the quantity of material transferred can be monitored.

The containers may be formed from a plastics material, especially a thermoplastics material.

An example of the present invention will now be described with reference to the accompanying drawings, in which.

Figure 1:
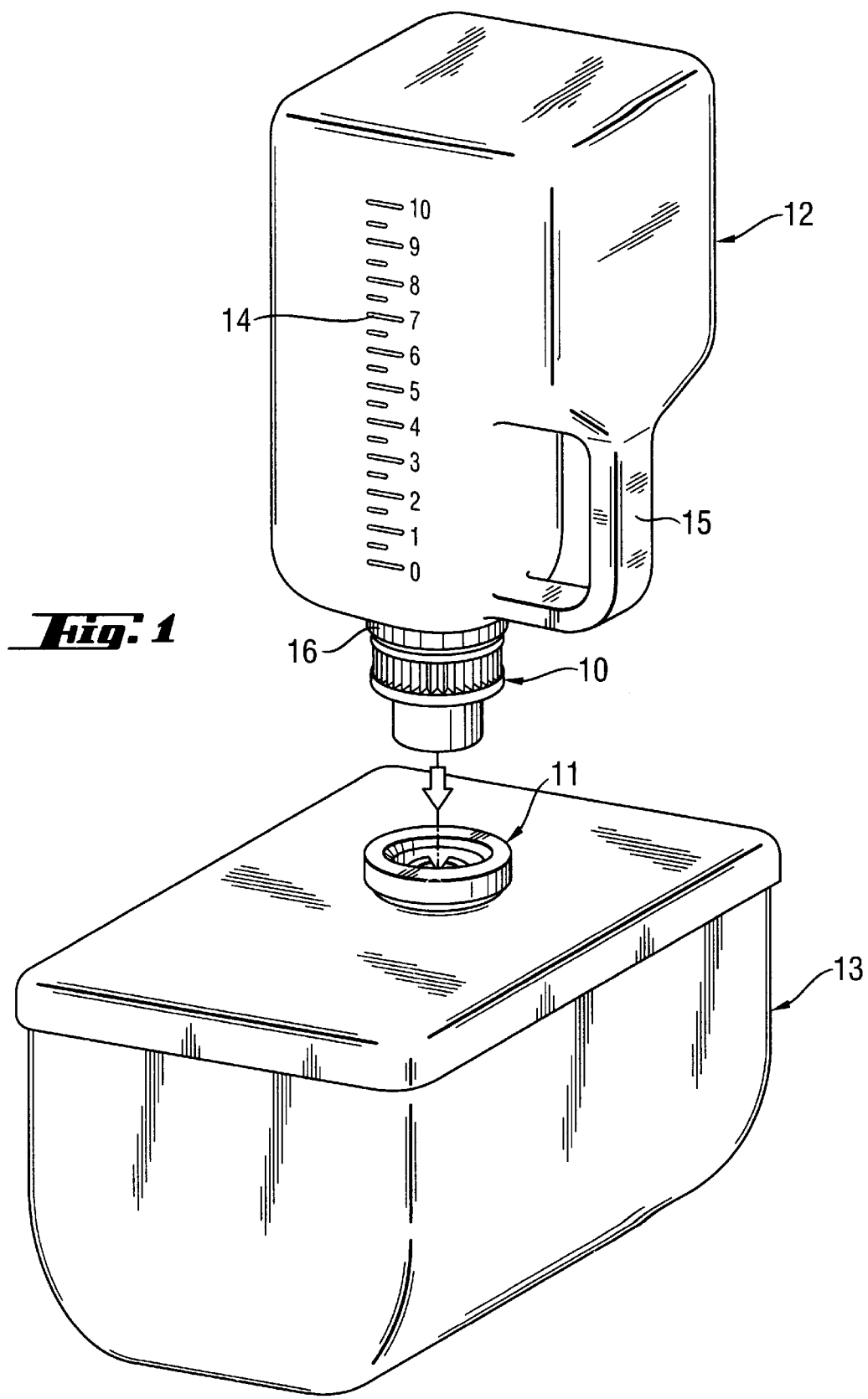
FIG. 1 is a perspective view of a container and a receiving unit to which a valve is attached, prior to connection.
Figure 2:
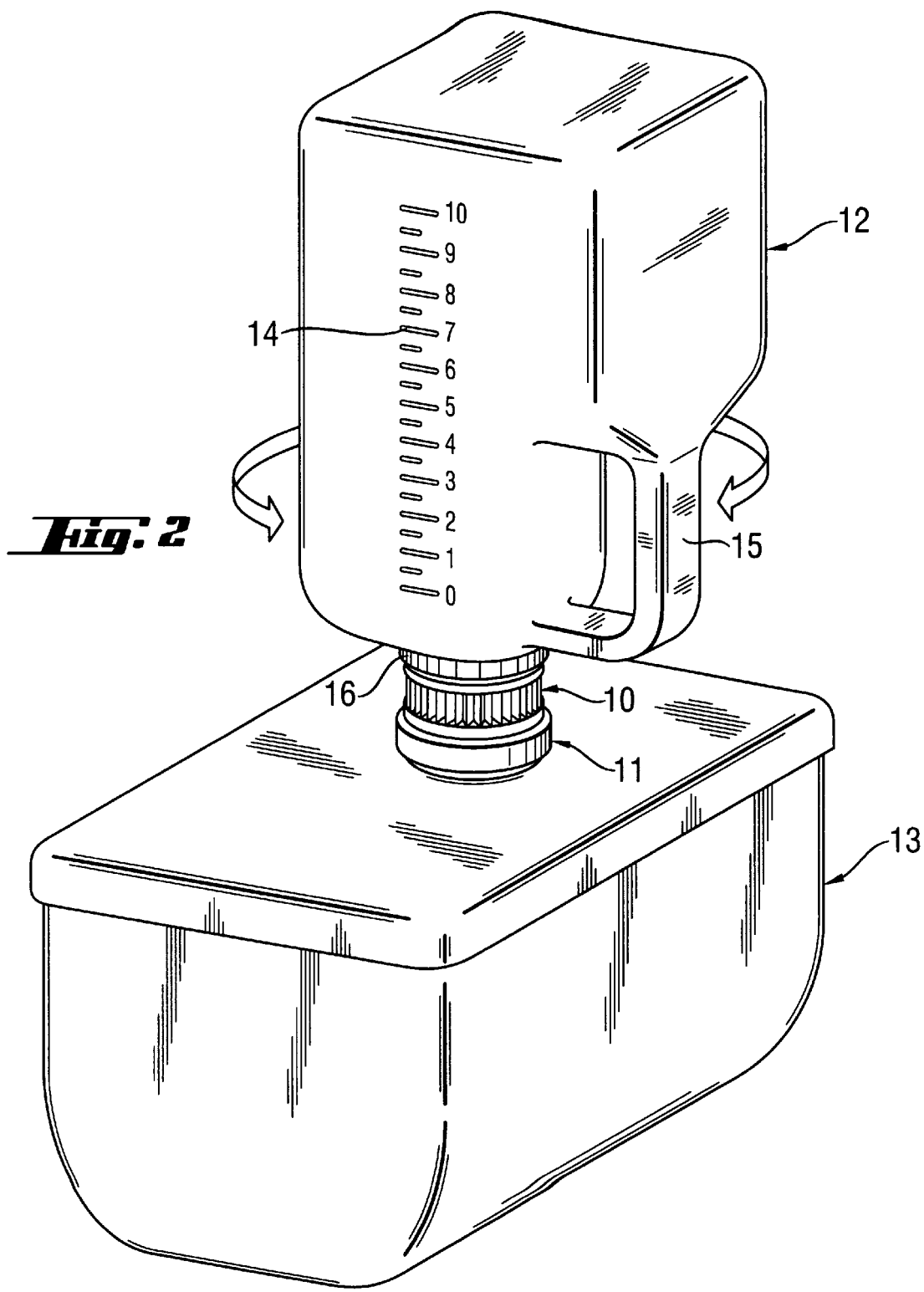
FIG. 2 is a perspective view of a container and a receiving unit to which a valve has been fitted, after connection.

Referring to FIGS. 1 and 2, a valve is shown prior to connection and after connection. The valve is provided with a self-sealing valve 10 connected to a first container 12 which is provided with graduations 14, a handle 15 and a tamper evident ring 16. The container is, in this example, formed from a plastics material. A coupling unit 11 is provided on the uppermost surface of a second container 13. The valve 10 is operated by rotating the first container 12 in relation to the coupling unit 11 on the second container 13. The valve and the mechanism by which it is opened is now described with reference to FIGS. 3 to 5. In the example the valve has a diameter of approximately 6 cm, and the first container neck a diameter of approximately 8 cm.

Figure 3:
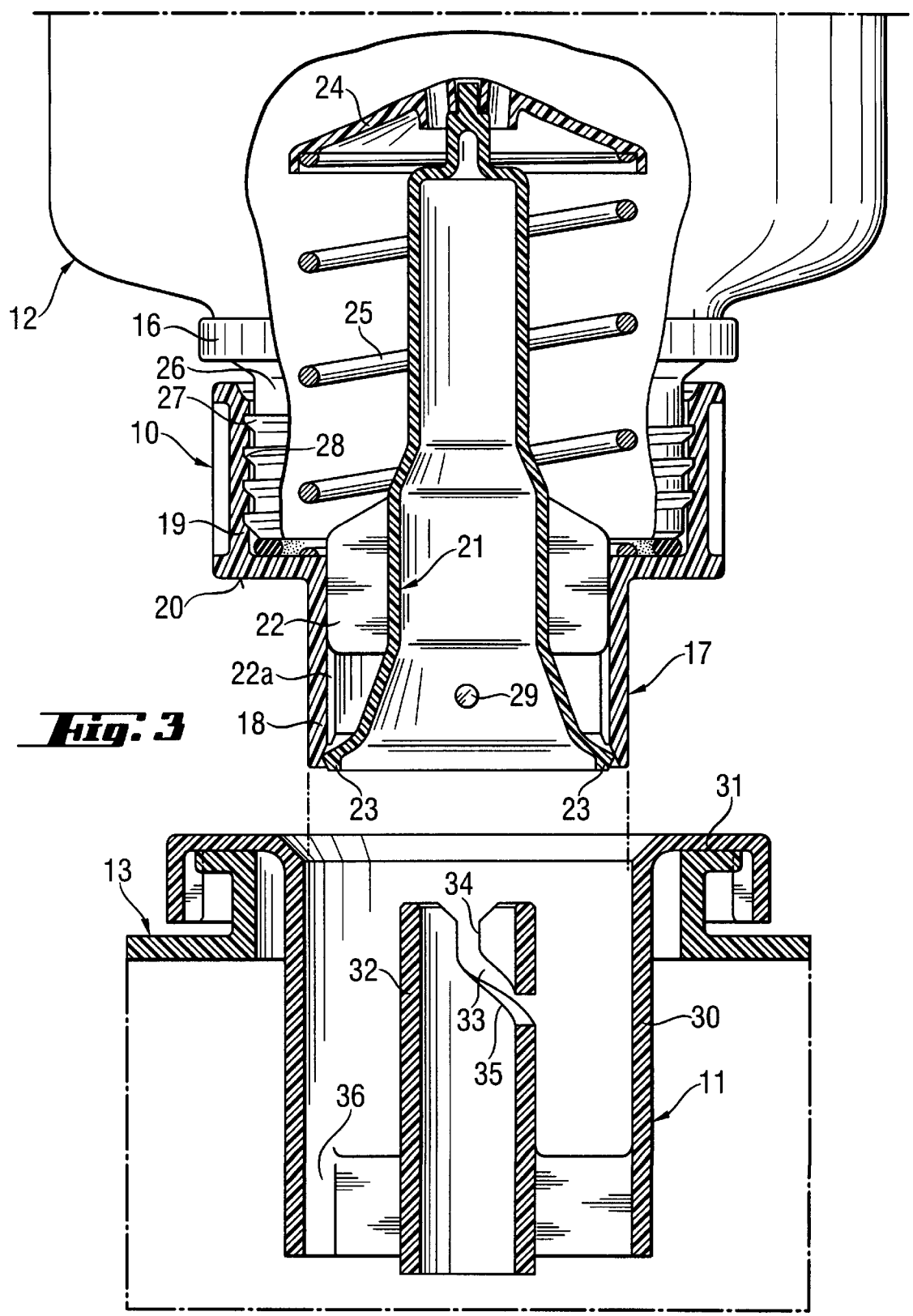
FIG. 3 is a sectional view of a valve prior to connection.

FIG. 3 shows the valve prior to engagement of the valve 10 with the coupling unit 11. The first container 12 and to which the valve 10 is fitted has been inverted. The valve 10 comprises a substantially cylindrical main body 17 which is provided with two portions 18,19 which are separated by a shoulder 20. A first portion 18 is radially smaller than a second portion 19 and can be inserted into the coupling unit 11. A circular moveable valve member 21 is provided coaxially with the main body 17. A number of fins 22 extend radially from the movable valve member 21 and engage in grooves (not shown) on the main body 17 in which the valve member 21 slides, opening and closing the valve. The valve member 21 is provided with sealing faces 23 at one end and at the opposite end is provided with a cap 24. A helical spring 25 is located between the cap 24 and the inner face of the shoulder 20 and is in a partially compressed state. The spring 25 provides the biasing means for urging the valve member 21 to a closed position.

The first container 12 is provided with a neck 26 having external threads 27 which engage with internal threads 28 located on the inner face of the second portion 19 of the valve body. A tamper evident ring 16 is provided at the base of the neck 26 and engages on a serrated section on the first container 12. When the valve 10 is screwed on to the first container 12, the tamper evident ring locates and locks into complementary recessed slots provided on the main body 17 of the valve. If there is relative rotation of the first container 12 to the valve 10, the tamper evident ring 16 is broken and can be easily spotted by an operator. A horizontal locating pin 29 is provided proximate to the sealing face end of the valve member 21.

The coupling unit 11 is provided with a substantially cylindrical main body 30 having, at one end, an overturned lip 31 for abutting against the outer face of the shoulder 20. A central tube 32 is provided with a slot 33 having a vertical section 34 and a downwardly cut spiral section 35. The coupling unit 11 is provided with a bore 36 extending therethrough for allowing the passage of granular material.

Figure 4:
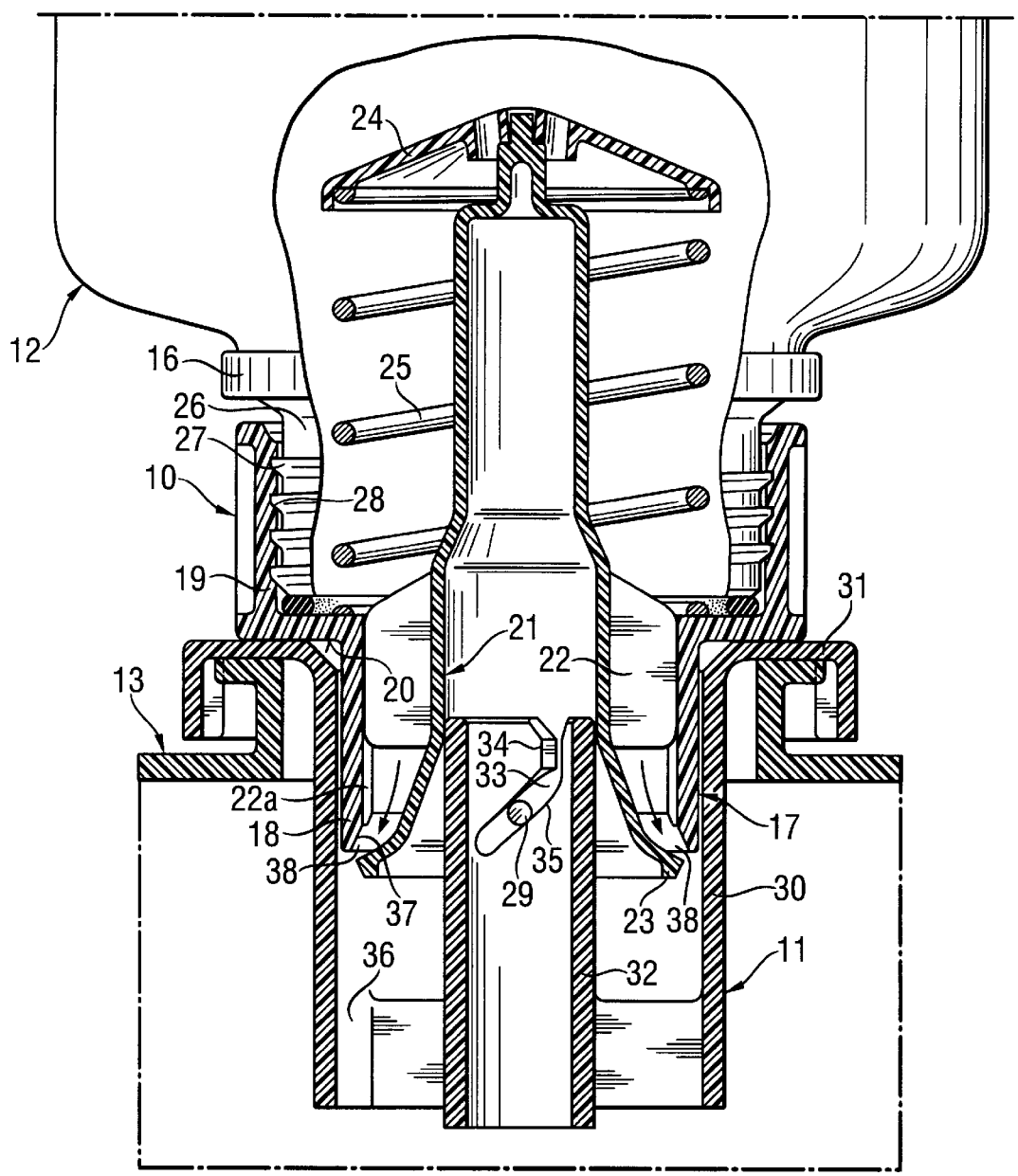
FIG. 4 is a sectional view of a valve when the valve is partially open.

FIG. 4 shows the valve in a partially opened state. The valve 10 is engaged with the coupling unit 11 by placing the locating pin 9 in the vertical section 34 of the slot 33. The shoulder 20 on the valve 10 abuts against the overturned lip 31 of the coupling unit 11. As the first container 12 is rotated, the valve member 21 is forced to move downward as the fins 22 are located in grooves (not shown) on the valve body 17. As the valve is turned, the locating pin 29 is forced to move along the downwardly cut spiral section 35 of the slot 33. As the locating pin 29 is forced downwardly, the valve member 21 is urged in a downwardly direction and hence a gap 38 opens between the sealing faces 23 and the valve seat 37. The degree of opening of the valve 10 and hence the discharge rate of granular material can be precisely regulated by the operator by controlling how far the container is twisted. Further the container 12 can be completely emptied or part emptied of its granular contents.

Figure 5:
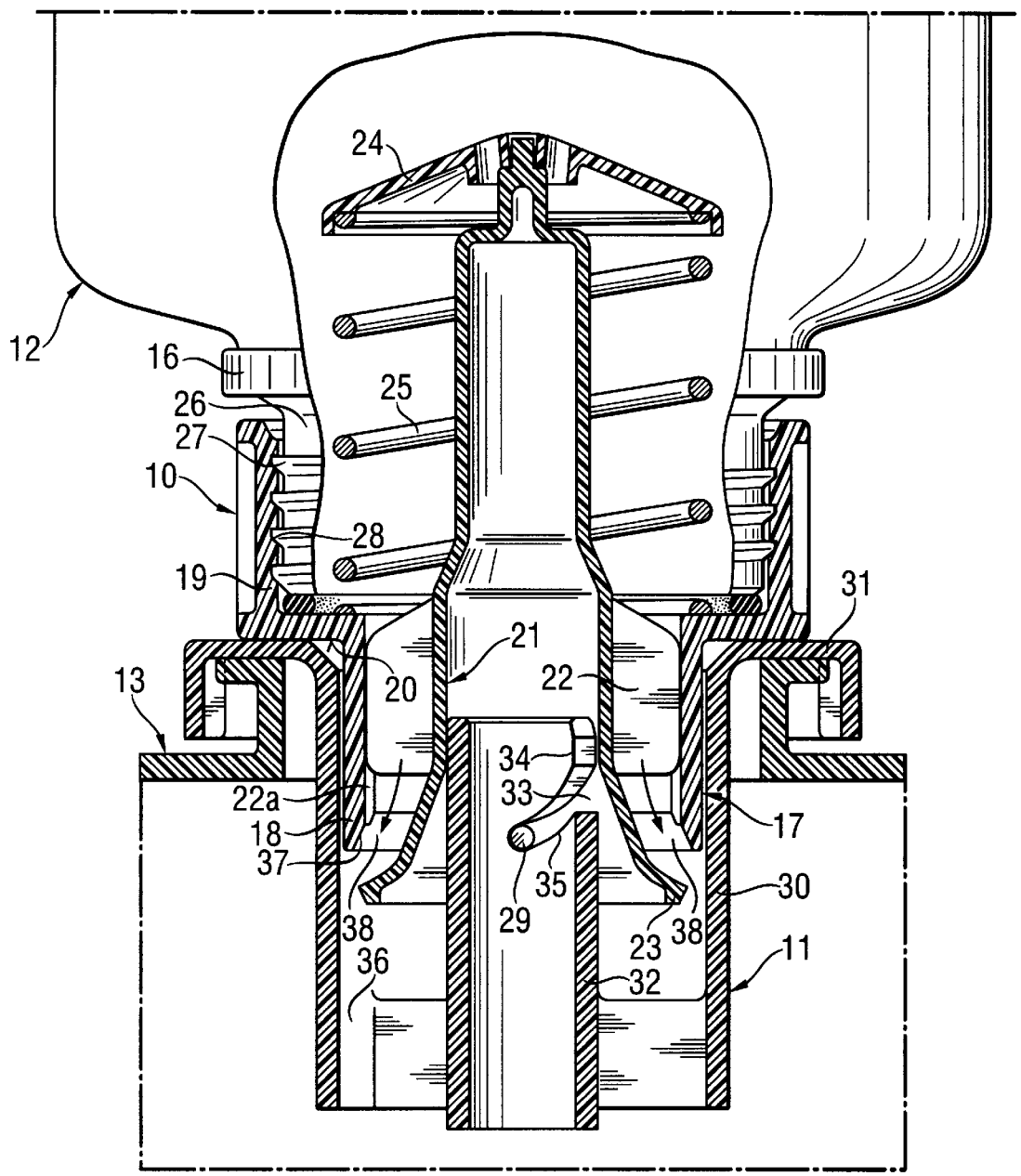
FIG. 5 is a sectional view of a valve in which the valve member is fully opened.

FIG. 5 shows the valve system when the valve 10 is in a fully opened position and as such the opening 38 is at its maximum extent.

The valve 10 is closed by rotating the first container 12 in the opposite direction which causes the locating pin 29 to move upwards in the spiral section 35 of the slot 33. With the compression tension of the helical spring 25 urging the valve member 21 in an upwardly direction, the sealing faces 23 cut through the granular flow and seal against the valve seat 37. Any granules that have not been retained in the valve 10 are allowed to fall through the bore 36 of the coupling unit 11. Once the first container 12 has been returned to its stop position and the valve has been fully closed, the operator can remove the first container 12 and valve 10 from the coupling unit 11. This can only be achieved when the valve is in the fully closed position and hence the locating pin 29 is at the base of the vertical section 34 of the groove 33. This prevents the operator from accidentally separating the first container 12 from the coupling unit 11 while the valve 10 is in an open position. This accordingly reduces the risk of a spillage of the granular material.

What is claimed is:

1. A valve, adapted to be attached to a first container, said first container adapted to contain a granular product therein, and adapted to be attached to a second container, said second container having a valve coupling unit thereon, whereby said valve is adapted to connect to said second container through said valve coupling unit, said valve adapted to control the flow of said granular product from said first container into said second container, said valve comprising:

a movable valve member;

a biasing means which biases said movable valve member to a closed position;

engagement means which is adapted to engage said valve coupling unit whereby when said valve is coupled with said coupling unit, the relative rotation of said valve to said valve coupling unit controls the extent to which said valve is opened;

said valve firther comprising connecting means adapted to connect said valve to said first container, said connecting means comprising:

a connecting member surrounding said engagement means and having a screw thread for threadably engaging a corresponding screw thread in said first container; and the valve member being positioned coaxially within said connecting means;

said connecting member further having at least one coaxial groove therein;

said connecting means further comprising at least one fin for engagement with said coaxial groove in said connecting member;

said valve further comprising a cap connecting said valve member with said connecting member.

2. The valve according to claim 1, further comprising a valve seat on which the movable valve member rests when in the closed position.

3. The valve according to claim 1, wherein the movable valve member is provided with sealing faces which cut through the granule flow to prevent granular material from being trapped between the movable valve member and the valve seat when the valve is closed.

4. The valve according to claim 1, wherein said coupling unit has a spiral section therein, and the movable valve member is provided with a pin for engagement, in use, in said spiral section in the coupling unit.

5. The valve according to claim 4, wherein the pin can only be removed from the spiral section when the movable valve member is in the fully closed position.

6. The valve according to claim 1, wherein the biasing means is a helical steel spring.

7. The valve according to claim 1, wherein further comprising a tamper evident ring adapted for engagement, in use with the first container.

8. A system adapted for transferring granules from a first container to a second container, the system comprising:

(1) a rotatable valve and (2) a coupling unit;

said rotatable valve adapted to be attached to said first container, said first container adapted to contain a granular product therein;

and said coupling unit adapted to be attached to said second container;

said coupling unit having means adapted for engagement with said rotatable valve;

whereby said valve is adapted to connect to said second container through said coupling unit, said valve adapted to control the flow of said granular product from said first container into said second container, said valve comprising:

a movable valve member;

a biasing means which biases said movable valve member to a closed position;

engagement means which is adapted to engage said valve coupling unit whereby when said valve is coupled with said coupling unit, the relative rotation of said valve to said valve coupling unit controls the extent to which said valve is opened;

said valve further comprising connecting means adapted to connect said valve to said first container, said connecting means comprising:

a connecting member surrounding said engagement means and having a screw thread for threadably engaging a corresponding screw thread in said first container; and the valve member being positioned coaxially within said connecting means;

said connecting member further having at least one coaxial groove therein;

said connecting means further comprising at least one fin for engagement with said coaxial groove in said connecting member;

said valve further comprising a cap connecting said valve member with said connecting member.

9. The system according to claim 8, wherein the coupling unit is provided with a central tube, said central tube having a slot adapted for engagement with the movable valve member.

10. The system according to claim 9, wherein the slot is provided with a section substantially parallel to an axis of said valve and a spiral section.

11. The system according to claim 8, wherein the said second container is a mixing tank and said coupling unit is attached to said mixing tank or to a tube which feeds directly into the mixing tank.

12. The system according to claim 8, wherein either or both of said first and second containers are translucent.

13. The system according to claim 8, wherein either or both of said first and second containers have graduated markings.

14. A container having a valve, said container being a first container adapted to contain a granular product therein, said valve adapted to be attached to a second container, said second container having a valve coupling unit thereon, whereby said valve is adapted to connect to said second container through said valve coupling unit, said valve adapted to control the flow of said granular product from said first container into said second container, said valve comprising:

a movable valve member;

a biasing means which biases said movable valve member to a closed position;

engagement means which is adapted to engage said valve coupling unit whereby when said valve is coupled with said coupling unit, the relative rotation of said valve to said valve coupling unit controls the extent to which said valve is opened;

said valve further comprising connecting means adapted to connect said valve t o said first container, said connecting means comprising:

a connecting member surrounding said engagement means and having a screw thread for threadably engaging a corresponding screw thread in said first container; and the valve member being positioned coaxially within said connecting means;

said connecting member further having at least one coaxial groove therein;

said connecting means further comprising at least one fin for engagement with said coaxial groove in said connecting member;

said valve further comprising a cap connecting said valve member with said connecting member.

15. The container according to claim 14 the container holding granular pesticide.

* * * * *